(12) United States Patent
Sapuntzakis et al.

(10) Patent No.: US 8,572,741 B2
(45) Date of Patent: Oct. 29, 2013

(54) PROVIDING SECURITY FOR A VIRTUAL MACHINE BY SELECTIVELY TRIGGERING A HOST SECURITY SCAN

(75) Inventors: Constantine P. Sapuntzakis, Mountain View, CA (US); Burt A. Toma, Hillsborough, CA (US); Phanindra V. R. Ganti, Cupertino, CA (US); Robert A. Iannucci, Jr., Redwood City, CA (US); Prakash Linga, San Carlos, CA (US)

(73) Assignee: Moka5, Inc., Redwood City, CA (US)

( * ) Notice: Subject to any disclaimer, the term of this patent is extended or adjusted under 35 U.S.C. 154(b) by 387 days.

(21) Appl. No.: 12/904,686

(22) Filed: Oct. 14, 2010

(65) Prior Publication Data

US 2012/0096550 A1    Apr. 19, 2012

(51) Int. Cl.
*G06F 21/00*       (2013.01)

(52) U.S. Cl.
USPC ........ 726/24; 726/3; 726/23; 726/25; 726/26; 718/1

(58) Field of Classification Search
USPC ................ 726/23–26, 3; 718/1; 717/171
See application file for complete search history.

(56) References Cited

U.S. PATENT DOCUMENTS

| | | | |
|---|---|---|---|
| 2008/0263658 A1* | 10/2008 | Michael et al. | 726/22 |
| 2009/0158432 A1* | 6/2009 | Zheng et al. | 726/24 |
| 2009/0187991 A1* | 7/2009 | Freericks et al. | 726/24 |
| 2010/0175108 A1* | 7/2010 | Protas | 726/3 |
| 2011/0265076 A1* | 10/2011 | Thorat et al. | 717/172 |

\* cited by examiner

*Primary Examiner* — Brandon Hoffman
*Assistant Examiner* — Hee Song
(74) *Attorney, Agent, or Firm* — Park, Vaughan, Fleming & Dowler LLP

(57) ABSTRACT

The disclosed embodiments provide a system that protects an application from malware on a host system. During operation, the system receives a command to commence execution of the application on the host system. In response to the command, the system causes a security scan to be performed on the host system to detect malware, wherein the malware can compromise the security of the application. The system also restricts one or more operations associated with the application until the security scan successfully completes.

31 Claims, 4 Drawing Sheets

PROVIDING SECURITY FOR A VIRTUAL MACHINE BY SELECTIVELY TRIGGERING A HOST SECURITY SCAN

BACKGROUND

1. Field

The disclosed embodiments generally relate to techniques for executing virtual machines within computer systems. More specifically, the disclosed embodiments relate to techniques for providing security by selectively triggering a security scan within a host operating system for a virtual machine.

2. Related Art

Virtual machines are often used to extend the functionality and portability of computing environments. For example, a virtual machine containing a guest operating system may be executed on any computer with a compatible virtual machine monitor (also referred to as a "hypervisor"). The self-contained nature of a virtual machine can also facilitate efficiently transferring the virtual machine to different computing platforms, including personal computers, servers, and portable storage devices.

Additionally, ease of deployment and portability of virtual machines may be further enhanced through the centralized management and local execution of virtual machines. An exemplary central management solution for locally executed virtual machines is embodied in the MokaFive Server™, MokaFive Player™ and MokaFive Creator™ products, which are offered by moka5, Inc. (a Delaware corporation). In particular, a virtual machine may be centrally defined using the MokaFive Creator™ and managed using the MokaFive Server™. Then, any computer containing the MokaFive Player™ can download an image of the virtual machine from the MokaFive Server™ and can run the virtual machine within the MokaFive Player™. Changes made to the virtual machine from the computer may be backed up on the MokaFive Server™ so that subsequent execution of the virtual machine from other computers can take advantage of the changes. Similarly, updates to the virtual machine may be administered by the MokaFive Server™ and automatically included in the virtual machine image so that subsequent use of the virtual machine includes the updates.

Because a virtual machine can be deployed across a wide range of diverse computing devices, ensuring security for a virtual machine can be a challenging task. For example, when the virtual machine initially launches within a host operating system, the user is typically presented with an authorization dialog box which asks for a username and password. However, if malware exists on the host operating system, the malware can potentially use key-logging techniques to steal the username and password. Additionally, when the virtual machine is up and running, malware can potentially use screen-scraping techniques to steal data which is displayed by the virtual machine. The malware can also potentially use code that implements a "rootkit" to gain privileged access to the computer system.

Hence, what is needed is a method and an apparatus for protecting a virtual machine against these types of malware attacks.

SUMMARY

The disclosed embodiments provide a system that protects an application from malware on a host system. During operation, the system receives a command to commence execution of the application on the host system. In response to the command, the system causes a security scan to be performed on the host system to detect malware, wherein the malware can compromise the security of the application. The system also restricts one or more operations associated with the application until the security scan successfully completes.

Note that the security scan can alternatively be performed by a network service implemented on one or more remote machines. For example, this can involve sending data to be scanned across a network to the one or more remote machines that implement network service. This network service can maintain aggregate statistics on virus infection and can use these aggregate statistics to predict widespread virus infections.

In addition, the disclosed embodiments can also support custom trigger points for scans which may be application-specific. For example, scans can be triggered whenever an application: reads and decrypts an encrypted file; displays an authentication dialog; writes data to disk; or performs an application-shut-down operation.

In some embodiments, restricting the one or more operations involves preventing a user from entering a username and password associated with the application, thereby preventing key-logging malware from intercepting the username and password. For example, to prevent the user from entering the username and password, the system can "grey out" an authorization dialog box so that the user is prevented from entering the username and password into the authorization dialog box. The system can also display a message to the user indicating that a "security scan is in progress." Next, after the security scan completes successfully, the system can "ungrey" the authorization dialog box so that the user can enter the username and password into the authorization dialog box.

In some embodiments, restricting the one or more operations associated with the application involves obscuring a screen or preventing the application from displaying the screen, thereby preventing screen-scraping malware from scraping data from the screen.

In some embodiments, commencing execution of the application on the host system involves either: (1) initially launching the application on the host system; or (2) resuming execution of the application on the host system when execution of the application was previously suspended.

In some embodiments, the application is a virtual machine.

In some embodiments, the application is a virtual machine monitor (hypervisor) for a virtual machine, wherein the virtual machine monitor can trigger execution of the virtual machine. In some of these embodiments, triggering execution of the virtual machine can involve: causing a second security scan to be performed on the host system to detect malware, wherein the malware can compromise the security of the virtual machine; commencing execution of the virtual machine on the host system; and restricting one or more operations associated with the virtual machine until the second security scan successfully completes.

In some embodiments, the security scan examines: running processes which are resident in memory; any executable code which is to be loaded into memory; and any code that can potentially inject malware.

In some embodiments, causing the security scan to be performed on the host system involves determining whether the security scan was performed within a preceding time interval, and if not, triggering the security scan.

In some embodiments, causing the security scan to be performed on the host system involves ensuring that an existing security scanner within the host system is installed, running and up-to-date. It can also involve verifying that the existing security scanner was recently executed and that results of the recent scan were negative.

In some embodiments, if the security scan detects malware, the system can: (1) notify a user and/or an administrator about the malware; and (2) continue to restrict the one or more operations associated with the application.

In some embodiments, performing the security scan on the host system involves uploading data from the host system to a remote computing system (for example, to a cloud computing system), so that the remote computing system can perform the security scan.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

System

Figure 1:
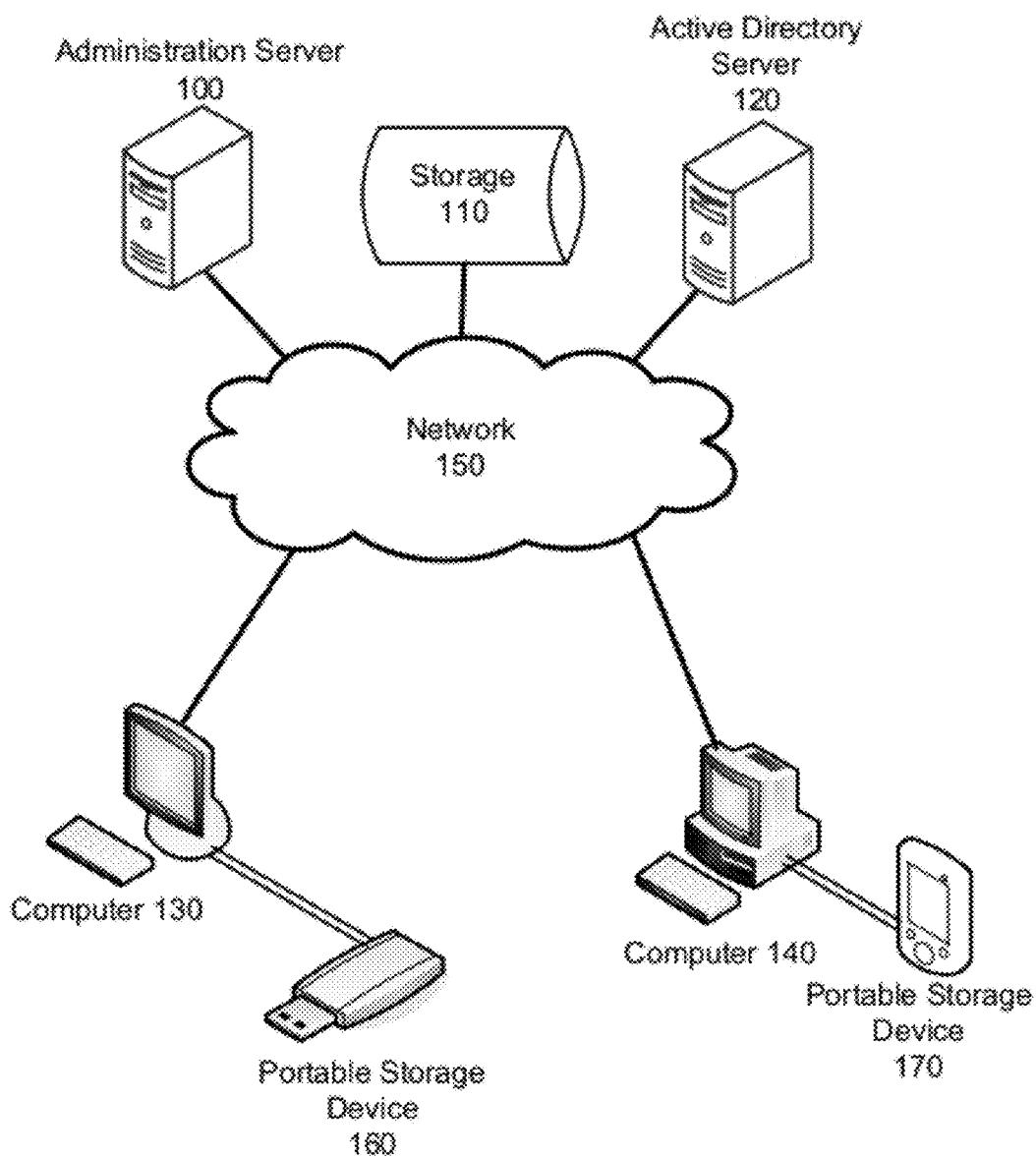
FIG. 1 presents a diagram of a networked system in accordance with the disclosed embodiments.

FIG. 1 presents a diagram of a networked system in accordance with the disclosed embodiments. As shown in FIG. 1, the networked system includes an administration server 100, storage 110, an active directory server 120, a set of computers 130-140, a network 150, and a set of portable storage devices 160-170. Each of the components is described in further detail below.

Computers 130-140 may correspond to electronic computing devices that operate as computing devices for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication among devices (e.g., administration server 100, storage 110, active directory server 120, computers 130-140) connected to network 150. For example, computers 130-140 may operate as clients in network 150 and allow users of computers 130-140 to send and receive emails, retrieve webpages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments running Linux (Linux is a registered trademark of Linus Torvalds), Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation™ (Windows), VMware Fusion™ (Mac), VMware Player™ (VMware Workstation™, VMware Fusion™ and VMware Player™ are registered trademarks of VMware, Inc.), Parallels, and VirtualBox (VirtualBox™ is a registered trademark of Oracle, Inc.) may be used to provide these capabilities.

In one or more embodiments, the system of FIG. 1 enables the central management and local execution of virtual computing environments. Such central management and local execution may allow virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server™, MokaFive Player™ and MokaFive Creator™ products offered by moka5, Inc. (a Delaware corporation). In particular, the MokaFive Player™ may be used with computers 130-140 to locally execute a centrally defined and managed virtual computing environment according to rules and access controls defined in the MokaFive Server™.

In one or more embodiments, administration server 100 is a server that supports centralized definition of virtual computing environments and management of access and permissions to the same for local execution. For example, administration server 100 may correspond to the MokaFive Server™. Administration server 100 may itself execute in a virtual computing environment, (e.g., a VMware ESX environment). For example, an administrator of virtual computing environments for computers 130-140 may create, configure, and delete the virtual computing environments by interacting with administration server 100 through a management interface (e.g., graphical user interface (GUI), web-based user interface, etc.) provided by administration server 100. The administrator can also use administration server 100 to set parameters that specify if and when a host security scan takes place for a virtual machine. The administrator can also use tools on administration server 100 to bundle, install and update a customized security scanner. This enables the administrator select a specific security scanner to be executed or to write their own security scanner.

In one or more embodiments, active directory server 120 provides network-based directory services. For example, active directory server 120 may correspond to a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies for virtual computing environments.

In one or more embodiments, virtual computing environments executed on computers 130-140 are stored within storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

In particular, each computer 130-140 may include one or more subscriptions to virtual computing environments. Each subscription may identify administration server 100 and a specific virtual computing environment provided by administration server 100. To execute the virtual computing environment, a user of the computer may provide authorization credentials for the virtual computing environment to administration server 100, which may relay the authorization credentials to the active directory server 120 as necessary. If the user is authorized to use the virtual computing environment, the virtual computing environment is downloaded from storage 110 over network 150 and loaded on the computer for use by the user. Loading and use of virtual computing environments within computers is discussed in further detail below with respect to FIG. 2.

Furthermore, virtual computing environments executing on computers 130-140 may be stored on and/or loaded from portable storage devices 160-170 coupled to computers 130-140, including Universal Serial Bus (USB) flash drives, flash memory cards, and/or portable computing devices (e.g., mobile phones, portable media players, etc.). Portable storage devices 160-170 may also include virtualization software (e.g., hypervisors), subscription information, user data, and/or other information required to load the virtual computing environments into any compatible computer (e.g., x86 computers) without pre-installation of software on the computer. In other words, the virtual computing environments and all information and software required to execute the virtual computing environments may be loaded, stored, and managed entirely from portable storage devices 160-170 instead of from computers 130-140 and/or network 150. However, network 150 may also be accessed periodically to retrieve updates to the virtual computing environments and/or authenticate the user as required by the access policies set on administration server 100.

Figure 2:
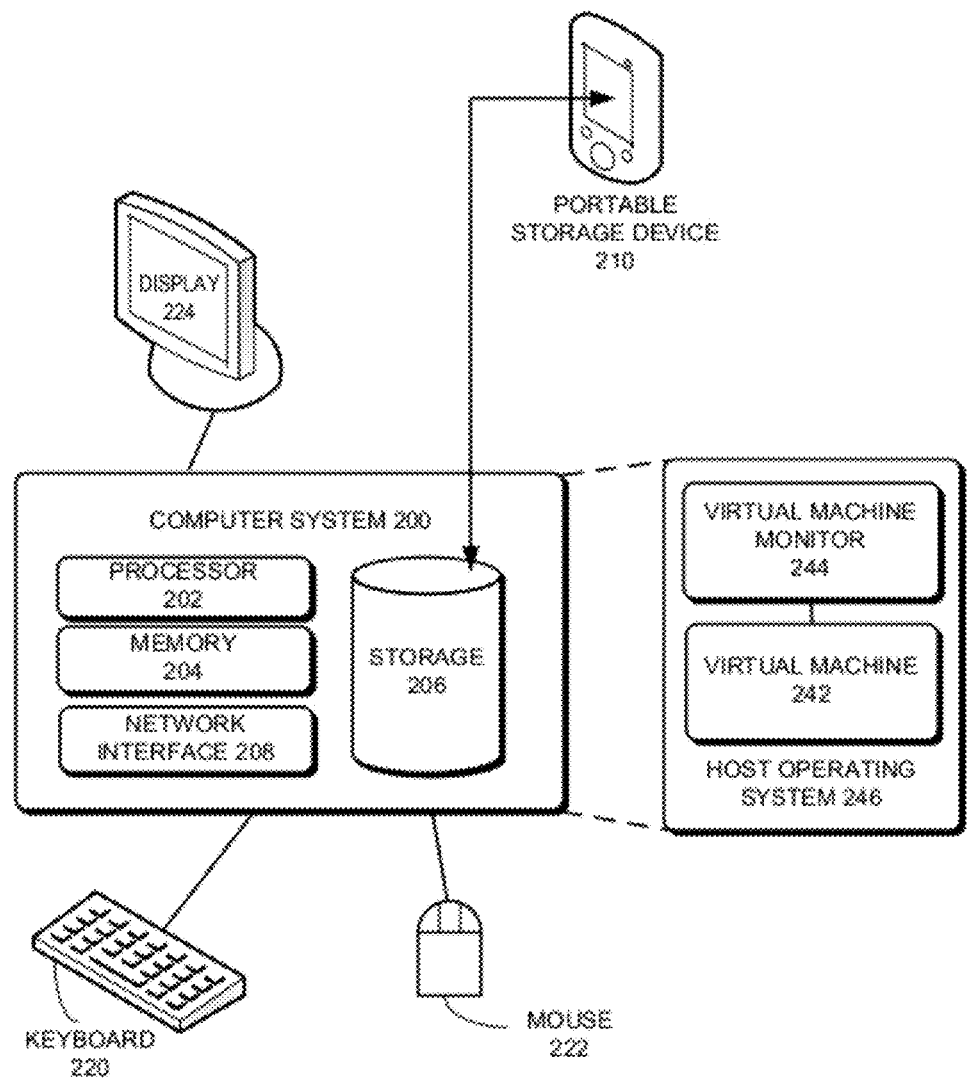
FIG. 2 illustrates a computer system in accordance with the disclosed embodiments.

FIG. 2 illustrates a computer system 200 in accordance with an embodiment. Computer system 200 may correspond to an electronic computing device (e.g., computers 130-140 of FIG. 1) that is connected to a network, such as network 150 of FIG. 1. Computer system 200 includes a processor 202, memory 204, storage 206, network interface 208, and/or other components found in electronic computing devices. Processor 202 may support parallel processing and/or multi-threaded operation with other processors in computer system 200. Computer system 200 may also include input/output (I/O) devices such as a keyboard 220, a mouse 222, and a display 224.

Computer system 200 may include functionality to execute various components of the present embodiments. In particular, computer system 200 may include a host operating system 246 that coordinates the use of hardware and software resources on computer system 200, as well as one or more applications that perform specialized tasks for the user. To perform tasks for the user, applications may obtain the use of hardware resources on computer system 200 from host operating system 246, as well as interact with the user through a hardware and/or software framework provided by host operating system 246.

In particular, computer system 200 may execute a virtual machine 242 (more generally referred to as a "virtual computing environment") obtained from network interface 208. For example, computer system 200 may download virtual machine 242 over the network from network-accessible storage (e.g., storage 110 of FIG. 1) according to instructions specified by an administration server (e.g., administration server 100 of FIG. 1). A virtual machine monitor (VM monitor) 244 on computer system 200 may then load virtual machine 242 into computer system 200 for local execution of virtual machine 242 on computer system 200.

In one or more embodiments, VM monitor 244 corresponds to a hosted VM monitor (e.g., type II VM monitor) that runs within host operating system 246 and obtains resources for the domains through host operating system 246. Alternatively, VM monitor 244 may function as a native VM monitor (e.g., type I VM monitor) that runs directly on hardware in computer system 200. For example, VM monitor 244 may include the MokaFive Player™.

Within computer system 200, virtual machine 242 may execute independently of a network connection with the administration server and/or storage, subject to any security policies defined for virtual machine 242 on the administration server. Alternatively, virtual machine 242 may require an intermittent and/or constant connection to the network as specified by a security policy on the administration server. For example, virtual machine 242 may continue executing on computer system 200 only if computer system 200 is capable of communicating with the administration server on a periodic basis (e.g., weekly). Such periodic communication may be required to enforce security in virtual machine 242 and/or to enable remote termination of virtual machine 242 from the administration server. A network connection may also be required for updates to virtual machine 242 to be received by computer system 200 from the network in accordance with a notification from the administration server.

As mentioned previously, virtual machine 242 may alternatively be obtained from a portable storage device 210 coupled to computer system 200 via a physical (e.g., USB) or wireless (e.g., Wireless USB, Bluetooth, Wi-Fi) connection with computer system 200. In particular, portable storage device 210 may store virtual machine 242, VM monitor 244, directory (e.g., user and user group) information, user data (e.g., documents, personal files, etc.), and/or other information required to load and execute virtual machine 242 on computer system 200 and/or other compatible computer systems (e.g., laptop computers, personal computers, workstations, etc.). Virtual machine 242 and associated information on portable storage device 210 may initially be obtained from the network and copied to portable storage device 210. Similarly, backups of virtual machine 242 and associated information may exist on the network and/or on computer system 200. Notably, one advantage according to these embodiments is the ability to connect portable storage device 210 to any compatible computer (e.g., x86 computer) and run virtual machine 242 on the computer's hardware resources (processor, network, display, keyboard, mouse, host OS and drivers) without obtaining and/or installing software required to run virtual machine 242 on the computer.

To reduce the amount of space occupied by virtual machine 242 and associated information on portable storage device 210, nonessential components of virtual machine 242 may be removed from the image of virtual machine 242 on portable storage device 210. For example, an operating system image may be configured to fit on portable storage device 210 by: removing drivers; disabling and/or removing system restore points and uninstall scripts; emptying the page file; and/or zeroing free space on the image. In addition, the software modules used to facilitate the execution of virtual machine 242 may be loaded to memory 204 or storage 206 on computer system 200 from portable storage device 210.

Host Operating System

Figure 3:
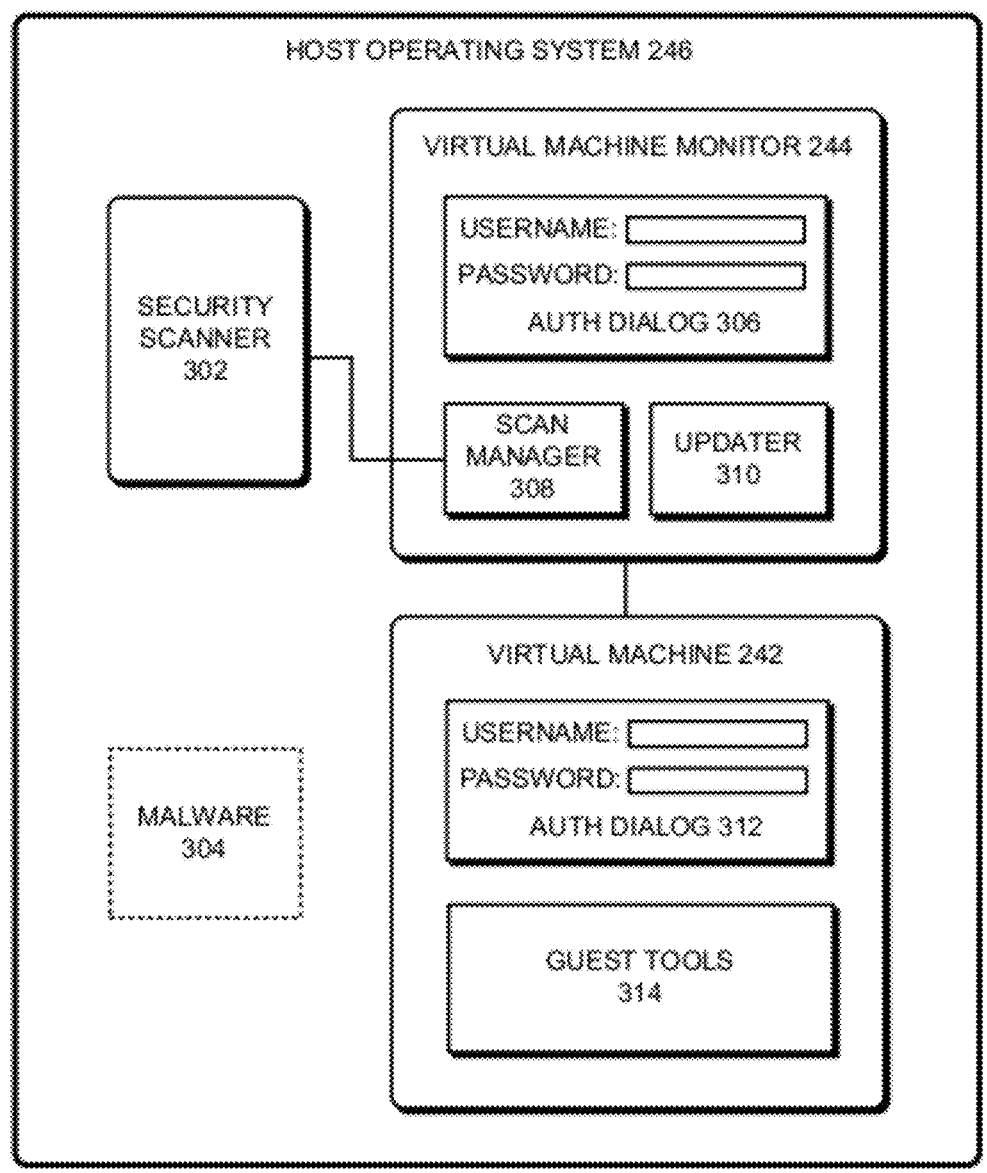
FIG. 3 illustrates a host operating system that is executing a virtual machine in accordance with the disclosed embodiments.

FIG. 3 illustrates a VM monitor (hypervisor) 244 and an associated virtual machine 242 within a host operating system 246 in accordance with the disclosed embodiments. As illustrated in FIG. 3 a VM monitor 244 (which, for example, can be a MokaFive Player™) executes within host operating system 246. (Note that "management agent" functionality can be integrated into VM monitor 224, wherein the management agent functionality can be used to control execution of a virtual machine.) When VM monitor 244 initially starts up, it can present an authentication dialog box 306 to a user. This enables the user to authenticate to VM monitor 244 by presenting a username and a password.

VM monitor 244 also includes a scan manager 308, which can cause a security scanner 302 to perform a security scan within host operating system 246. Note that security scanner 302 can generally include any type of security scanning software that scans through memory and possibly through non-volatile storage looking for malicious code. Security scanner 302 can include a pre-existing security scanner which is already installed within host operating system 246. Security scanner 302 can also be architected as a pluggable security scanner, which can be easily swapped with a different pluggable security scanner.

In general, security scanner 302 seeks to detect malware 304, which generally includes any type of malicious code within host operating system 246. This malware can be located in memory or possibly in files in non-volatile storage. Moreover, the security scanning process typically involves comparing signatures of code segments against a signature database for known malware. More specifically, to detect key-logging malware, screen-scraping malware or rootkit malware, the security scanner 302 can examine: running processes which are resident in memory, any executable code which is to be loaded into memory, or any code that potentially injects malware. Security scanner 302 can also maintain a "white list" containing approved applications which will not be identified as malware during a scan. This white list can be maintained by a system administrator.

VM monitor 244 also includes an updater 310, which ensures that software is up-to-date for both VM monitor 244 and virtual machine 242. Updater 310 can also ensure that security scanner 302 and associated signature files are up to date.

VM monitor 244 launches and controls virtual machine 242, wherein virtual machine 242 can generally include any type of software which provides a platform-independent virtual computing environment. When virtual machine 242 starts up, it can present an authentication dialog box 312 to a user, which enables the user to authenticate himself to virtual machine 242 by entering a username and a password. However, note that in some cases authorization credentials can be passed from the VM monitor 244 to virtual machine 242, in which case this second authentication step by virtual machine 242 can be skipped. Virtual machine 242 can also execute guest tools 314, which for example can include tools which run on a guest operating system, wherein the guest operating system runs on the virtual machine.

Process of Initializing Virtual Machine Monitor

Figure 4:
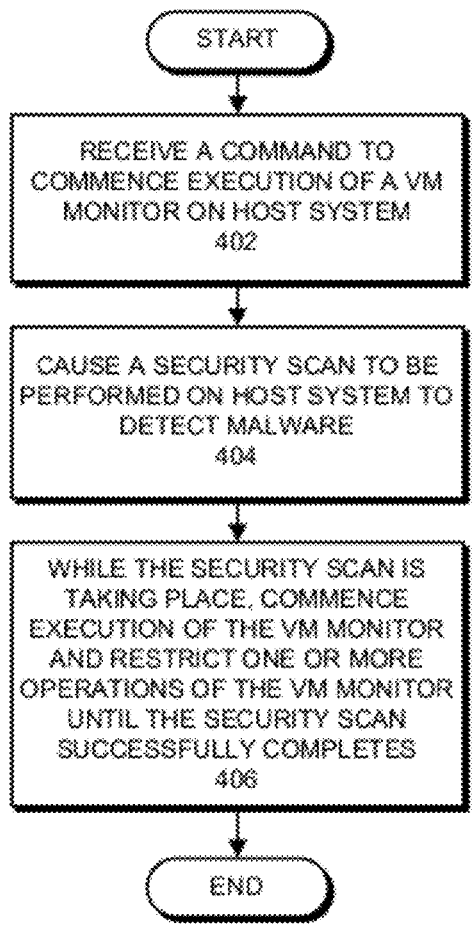
FIG. 4 presents a flow chart illustrating the process of initializing a virtual machine monitor in accordance with the disclosed embodiments.

FIG. 4 presents a flow chart illustrating the process of initializing a virtual machine monitor in accordance with the disclosed embodiments. During operation, the system receives a command to commence execution of a VM monitor (such as the MokeFive™ player) on the host system (step 402). In response to this command, the system causes a security scan to be performed on the host system to detect malware (step 404). As mentioned above, causing the security scan to be performed on the host system can involve determining whether the security scan was performed within a preceding time interval, and if not, triggering the security scan. In this way, if a security was performed recently, it will not be performed again. (Note that if a security scan was performed in the preceding time interval, the results of this security scan are taken to be the current results.)

Next, while the security scan is taking place, the system commences execution of the VM monitor and at the same time restricts one or more operations associated with the VM monitor until the security scan successfully completes (step 406). As mentioned above, restricting the operations can involve preventing a user from entering a username and password associated with the VM monitor. This prevents key-logging malware from intercepting the username and password. It can also involve preventing the VM monitor from displaying a screen, thereby preventing screen-scraping malware from scraping data from the screen. Restricting the operations can also involve obscuring a screen instead of just hiding the screen. (Note that a clever screen scraper can potentially read a screen even if it is minimized.)

If the security scan succeeds, the virtual machine is free to operate without restrictions. However, if the security scan detects malware, the system can display an error message to the user and can also display the results of the scan.

The security scanning software can also perform auditing operations and can record results of the auditing operations in a log file to construct an "audit trail." In this way, when a new virus is discovered and a signature is constructed for the new virus, the system can scan the audit trail in the log to see if the virus was encountered previously.

Process of Initializing Virtual Machine

Figure 5:
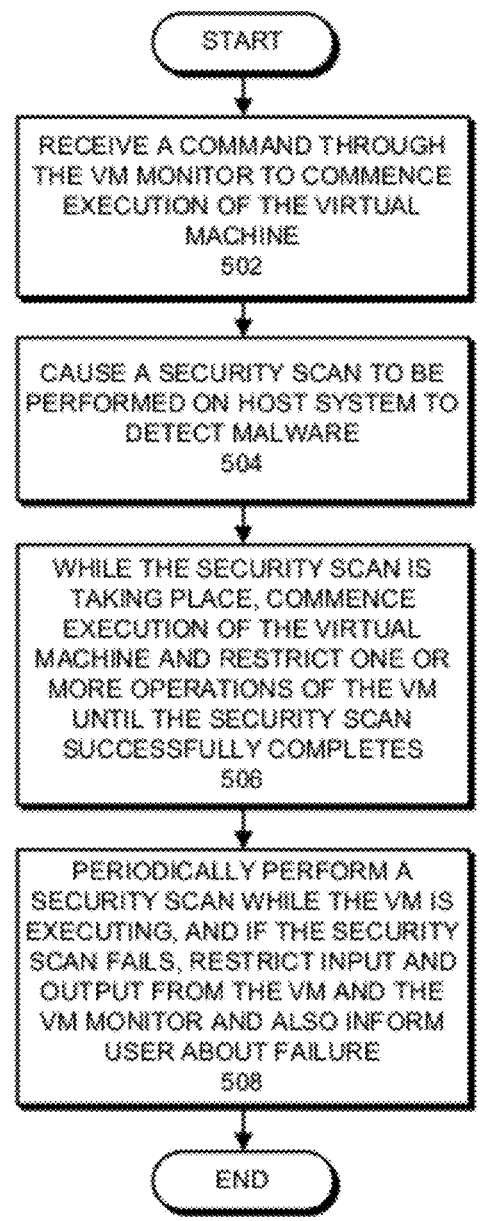
FIG. 5 presents a flow chart illustrating the process of initializing a virtual machine in accordance with the disclosed embodiments.

FIG. 5 presents a flow chart illustrating the process of initializing a virtual machine in accordance with the disclosed embodiments. First, the system receives a command through the VM monitor to commence execution of the virtual machine (step 502). For example, the user can click "Play" in the MokaFive Player™, which generates a command to commence execution of the virtual machine. In response to the command, the system causes a security scan to be performed on the host system to detect malware (step 504). Next, while the security scan is taking place, the system commences execution of the virtual machine and at the same time restricts one or more operations associated with the virtual machine until the security scan successfully completes (step 506). As mentioned above, the system can restrict entry of a username and password and can prevent the virtual machine from displaying a screen.

Finally, after the initial security scan, the system periodically performs a security scan on the host system while the application is executing. For example, this periodic scan can take place every 30 minutes. If this periodic security scan fails, the system can restrict data input and data output associated with the application and can notify a user (step 508).

Note that the above-described security scans also include progressive/differential scans, which for example can involve scanning just the modules which have been loaded since the last scan. These types of scans could potentially be continuous, and would be analogous to antivirus software's "active" protection modes.

Also note that results of scans performed for different applications can be cached, and the cached results can be used across different applications on a given host.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for protecting an application from malware on a host system, comprising:
   receiving a command to launch the application on the host system, wherein the application is a virtual machine or virtual machine monitor for a virtual machine; and
   in response to the command,
      commencing a security scan on the host system to detect malware before launching the application, wherein the malware can compromise security of the application and wherein the security scan examines running processes which are resident in memory,
      launching the application on the host system even if the security scan has not completed, and
      restricting one or more operations associated with the launched application until the security scan successfully completes.

2. The method of claim 1, wherein restricting the one or more operations associated with the application involves preventing a user from entering a password associated with the application, thereby preventing key-logging malware from intercepting the password.

3. The method of claim 2,
   wherein preventing the user from entering the password involves greying out an authorization dialog box so that the user is prevented from entering the password into the authorization dialog box; and
   wherein after the security scan completes successfully, the method further comprises ungreying the authorization dialog box so that the user can enter the password into the authorization dialog box.

4. The method of claim 1, wherein restricting the one or more operations associated with the application involves obscuring a screen or preventing the application from displaying the screen, thereby preventing screen-scraping malware from scraping data from the screen.

5. The method of claim 1, wherein the method further comprises:
   periodically performing a full or a progressive/differential security scan on the host system while the application is executing; and
   if a periodic security scan fails, restricting data input and data output associated with the application.

6. The method of claim 1, wherein the method further comprises performing a full or a progressive/differential security scan on the host system when a pre-specified trigger point is encountered during execution of the application.

7. The method of claim 6, wherein the pre-specified trigger point can include:
   the application reading and decrypting an encrypted file;
   the application displaying an authentication dialog;
   the application writing data to disk; or
   the application performing an application-shut-down operation.

8. The method of claim 1, wherein the virtual machine monitor can trigger execution of the virtual machine.

9. The method of claim 8, wherein triggering the execution of the virtual machine involves:
   causing a second security scan to be performed on the host system to detect malware, wherein the malware can compromise security of the virtual machine;
   commencing execution of the virtual machine on the host system; and
   restricting one or more operations associated with the virtual machine until the second security scan successfully completes.

10. The method of claim 1, wherein the security scan further examines one or more of the following:
    any executable code which is to be loaded into memory; and
    any code that can potentially inject malware.

11. The method of claim 1, wherein causing the security scan to be performed on the host system involves determining whether the security scan was performed within a preceding time interval, and if not, triggering the security scan.

12. The method of claim 1, wherein causing the security scan to be performed on the host system involves ensuring that an existing security scanner within the host system is installed, running and up-to-date.

13. The method of claim 1, wherein if the security scan detects malware, the method further comprises:
   notifying a user and/or an administrator about the malware; and continuing to restrict the one or more operations associated with the application.

14. The method of claim 1, wherein performing the security scan on the host system involves uploading data from the host system to a remote computing system, so that the remote computing system can perform the security scan.

15. The method of claim 1, wherein performing the security scan on the host system involves detecting the presence of a working malware scanner installed on the host system.

16. A non-transitory computer-readable storage medium storing instructions that when executed by a computer cause the computer to perform a method for protecting an application from malware on a host system, the method comprising:
   receiving a command to launch the application on the host system, wherein the application is a virtual machine or virtual machine monitor for a virtual machine; and
   in response to the command,
      commencing a security scan on the host system to detect malware before launching the application, wherein the malware can compromise security of the application and wherein the security scan examines running processes which are resident in memory,
      launching the application on the host system even if the security scan has not completed, and
      restricting one or more operations associated with the launched application until the security scan successfully completes.

17. The computer-readable storage medium of claim 16, wherein restricting the one or more operations associated with the application involves preventing a user from entering a password associated with the application, thereby preventing key-logging malware from intercepting the password.

18. The computer-readable storage medium of claim 17,
   wherein preventing the user from entering the password involves greying out an authorization dialog box so that the user is prevented from entering the password into the authorization dialog box; and
   wherein after the security scan completes successfully, the method further comprises ungreying the authorization dialog box so that the user can enter the password into the authorization dialog box.

19. The computer-readable storage medium of claim 16, wherein restricting the one or more operations associated with the application involves obscuring a screen or preventing the application from displaying the screen, thereby preventing screen-scraping malware from scraping data from the screen.

20. The computer-readable storage medium of claim 16, wherein the method further comprises:
   periodically performing a full or progressive/differential security scan on the host system while the application is executing; and
   if a periodic security scan fails, restricting data input and data output associated with the application.

21. The computer-readable storage medium of claim 16, wherein the method further comprises performing a full or progressive/differential security scan on the host system when a pre-specified trigger point is encountered during execution of the application.

22. The computer-readable storage medium of claim 21, wherein the pre-specified trigger point can include:
   the application reading and decrypting an encrypted file;
   the application displaying an authentication dialog;
   the application writing data to disk; or
   the application performing an application-shut-down operation.

23. The computer-readable storage medium of claim 16, wherein the virtual machine monitor can trigger execution of the virtual machine.

24. The computer-readable storage medium of claim 23, wherein triggering the execution of the virtual machine involves:
   causing a second security scan to be performed on the host system to detect malware, wherein the malware can compromise security of the virtual machine;
   commencing execution of the virtual machine on the host system; and
   restricting one or more operations associated with the virtual machine until the second security scan successfully completes.

25. The computer-readable storage medium of claim 16, wherein the security scan further examines one or more of the following:
   any executable code which is to be loaded into memory; and
   any code that can potentially inject malware.

26. The computer-readable storage medium of claim 16, wherein causing the security scan to be performed on the host system involves determining whether the security scan was performed within a preceding time interval, and if not, triggering the security scan.

27. The computer-readable storage medium of claim 16, wherein causing the security scan to be performed on the host system involves ensuring that an existing security scanner within the host system is installed, running and up-to-date.

28. The computer-readable storage medium of claim 16, wherein if the security scan detects malware, the computer-readable storage medium further comprises:
   notifying a user and/or an administrator about the malware; and
   continuing to restrict the one or more operations associated with the application.

29. The computer-readable storage medium of claim 16, wherein performing the security scan on the host system involves uploading data from the host system to a remote computing system, so that the remote computing system can perform the security scan.

30. The computer-readable storage medium of claim 16, wherein performing the security scan on the host system involves detecting the presence of a working malware scanner installed on the host system.

31. An apparatus that protects an application from malware on a host system, comprising:
   an execution mechanism configured to receive a command to launch the application on the host system, wherein in response to the command, the execution mechanism is configured to launch the application on the host system, wherein the application is a virtual machine or virtual machine monitor for a virtual machine; and
   a security mechanism, wherein in response to the command being received by the execution mechanism, the security mechanism is configured to,
      commence a security scan on the host system before launching the application, to detect malware, wherein the malware can compromise security of the application and wherein the security scan examines running processes which are resident in memory,
      launch the application on the host system even if the security scan has not completed, and
      restrict one or more operations associated with the launched application until the security scan successfully completes.

* * * * *